United States Patent
Drennen et al.

(10) Patent No.: US 6,435,320 B1
(45) Date of Patent: Aug. 20, 2002

(54) SOLENOID BASED PARK BRAKE METHOD

(75) Inventors: David B. Drennen; Patrick A. Mescher, both of Bellbrook; Harald Klode, Centerville; Gustavus P. Bock, Bellbrook, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/836,913

(22) Filed: Apr. 17, 2001

(51) Int. Cl.⁷ .................................................. B60L 7/00
(52) U.S. Cl. ...................... 188/164; 188/31; 188/72.3
(58) Field of Search .................. 188/31, 72.1, 72.3, 188/2 D, 162, 163, 164, 216

(56) References Cited

U.S. PATENT DOCUMENTS

| | | | | |
|---|---|---|---|---|
| 596,097 A | * | 12/1897 | Wellman et al. ............. | 112/220 |
| 2,245,958 A | * | 6/1941 | Barr et al. ................... | 188/162 |
| 3,734,245 A | * | 5/1973 | Hubbard ...................... | 188/163 |
| 4,022,301 A | * | 5/1977 | Hansen ........................ | 188/166 |
| 5,096,024 A | * | 3/1992 | Wu ............................. | 188/164 |
| 5,620,065 A | * | 4/1997 | Baker et al. ................. | 188/171 |
| 5,879,273 A | * | 3/1999 | Wei et al. .................... | 188/164 |
| 5,893,439 A | * | 4/1999 | Park ............................ | 188/31 |
| 6,139,460 A | | 10/2000 | Drennen et al. ............. | 475/149 |
| 6,170,615 B1 | * | 1/2001 | Cheng ......................... | 188/20 |
| 6,250,433 B1 | * | 6/2001 | Sealine et al. .............. | 180/273 |
| 6,293,372 B1 | * | 9/2001 | Lorenz et al. .............. | 188/171 |

FOREIGN PATENT DOCUMENTS

FR   2304838 A   *   3/1997

* cited by examiner

*Primary Examiner*—Jack Lavinder
*Assistant Examiner*—Xuan Lan Nguyen
(74) *Attorney, Agent, or Firm*—Scott A. McBain

(57) ABSTRACT

The electric park brake of the present invention includes an electric caliper motor assembly. The electric caliper motor assembly includes a motor, which is operably coupled to a shaft. The motor and shaft are surrounded by a housing. A cogwheel is disposed axially and operably connected to the shaft within the housing. A solenoid mechanism is disposed on the housing and positioned axially in relation to the shaft. There is at least one guide pin that is associated with the solenoid mechanism for interacting with the cogwheel when the solenoid is activated. The interaction between the at least one guide pin and the cogwheel provides a park brake feature and prevents movement of the shaft.

8 Claims, 2 Drawing Sheets

SOLENOID BASED PARK BRAKE METHOD

BACKGROUND OF THE INVENTION

Technical Field

The present invention generally relates to brakes for motor vehicles and, more particularly, to an electric park brake for use in an electric caliper brake system.

A brake system for a motor vehicle functionally reduces the speed of the vehicle or maintains the vehicle in a rest position. Various types of brake systems are used in automotive vehicles, including hydraulic, anti-lock (ABS), and electric, also referred to as "brake by wire". An electric brake system accomplishes the above functions of reducing speed and maintaining the vehicle in a rest position through the use of an electric caliper. Generally, the electric caliper includes a motor and a gear system to transfer the load or force that is necessary to stop or maintain the vehicle in a rest position.

Therefore, there is a need in the art for an electric park brake for use in an electric caliper brake system to maintain the vehicle in a rest position. There is a limited amount of space available for use by an electric caliper, which is limited by the available space within a wheel. Thus, there is a need in the art to provide an electric park brake for use in an electric caliper brake system that is spatially efficient.

SUMMARY OF THE INVENTION

There is provided, an electric park brake for use in an electric caliper brake system that satisfies those needs outlined above and provides an electric park brake that is spatially efficient. The electric park brake of the present invention includes an electric caliper motor assembly. The electric caliper motor assembly includes a motor, which is operably coupled to a shaft. The motor and shaft are surrounded by a housing. A cogwheel is disposed axially and operably connected to the shaft within the housing. A solenoid mechanism is disposed on the housing and positioned axially in relation to the shaft. There is at least one guide pin that is associated with the solenoid mechanism for interacting with the cogwheel when the solenoid is activated. The interaction between the at least one guide pin and the cogwheel provides a park brake feature and prevents movement of the shaft.

BRIEF DESCRIPTION OF THE DRAWINGS

The various advantages of the present invention will become apparent to one skilled in the art by reading the following specification and claims, and by referencing the following drawings in which:

DESCRIPTION OF THE PREFERRED EMBODIMENT

Figure 1:
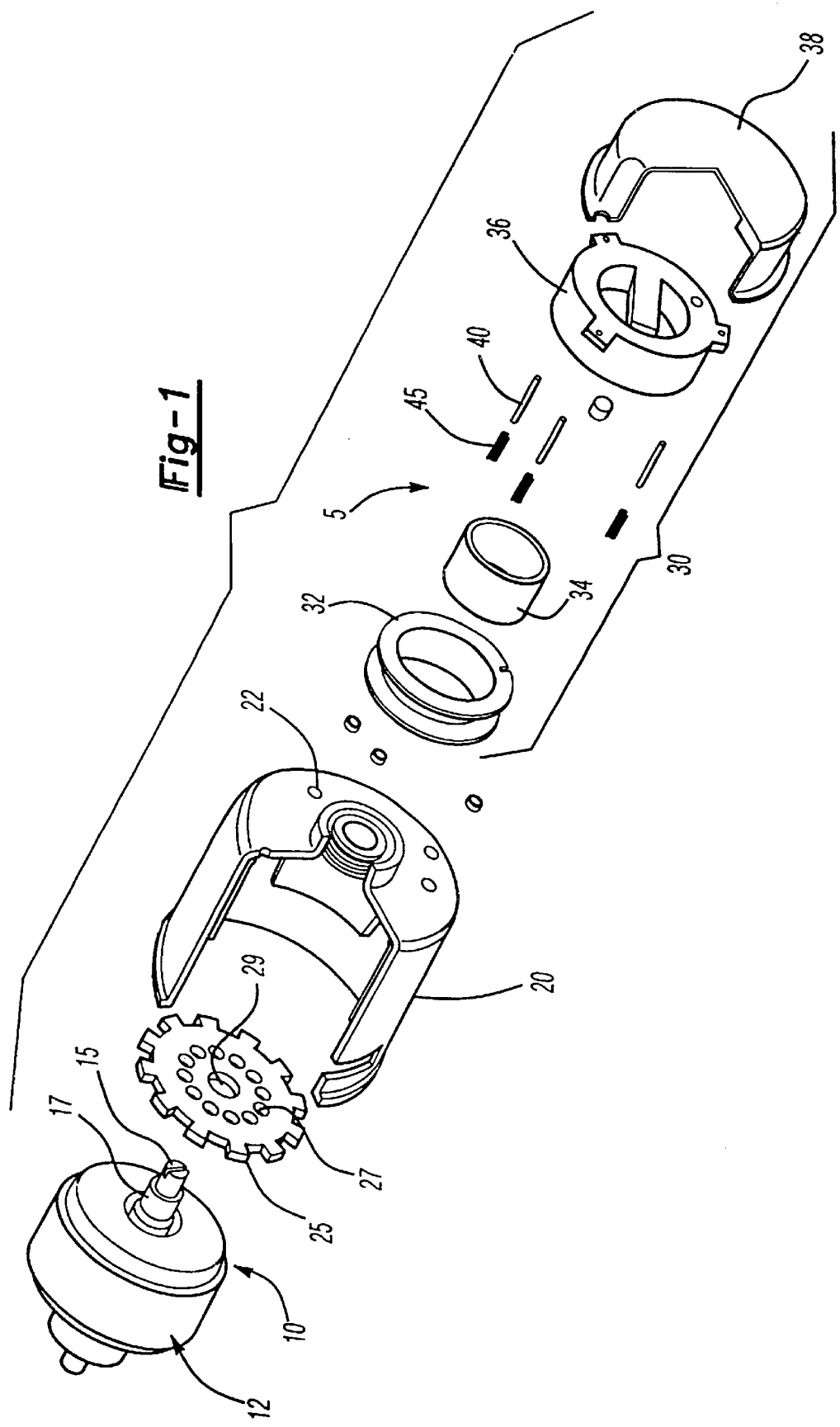
FIG. 1 is an exploded perspective view of the electric park brake and electric caliper brake system.

With reference to FIG. 1, there is shown the electric park brake 5 of the present invention. The electric park brake 5 includes an electric caliper motor assembly 10, a cogwheel 25, a solenoid mechanism 30, and at least one guide pin 40 associated with the solenoid mechanism.

The electric caliper motor assembly 10 includes an electric caliper motor 12 that is operably coupled to a shaft 15. The motor 12 provides the necessary mechanical force to operate the electric caliper. The motor 12 and shaft 15 are surrounded by a housing 20.

The electric park brake 5 also includes a cogwheel 25 that is disposed axially, on and operably connected to, the shaft 15. As can be seen in FIG. 1, the cogwheel has a central aperture 29 that corresponds to the shape of the shaft 15 to operably couple the cogwheel to the shaft. The cogwheel 25 further includes apertures 27 formed radially about its periphery to interact with guide pins 40 as will be disclosed further below. The cogwheel 25 is operably coupled to the shaft 15 within the housing 20.

Again with reference to FIG. 1, the electric park brake 5 includes a solenoid mechanism 30 that is disposed on the housing 20 and positioned axially in relation to the shaft 15. The solenoid mechanism 30 includes a bobbin 32, a flux ring 34, and a translation piece 36. The solenoid mechanism is surrounded by a high flux housing 38.

There is also included as part of the electric park brake 5, at least one guide pin 40 that is associated with the solenoid mechanism 30. The guide pin 40 is preferably a brass pin that is coupled to the translation piece 36, which moves the guide pins 40 when the solenoid mechanism 30 is activated. There are also included springs 45 disposed axially about the guide pin 40. The guide pins are preferably made of brass, but may also be made of any suitable material.

The housing includes apertures 22 formed therein corresponding to the location of the guide pins 40. As can be seen in FIG. 1, there are three guide pins 40 that are associated with the three holes 22 formed within the housing 20. As the solenoid mechanism 30 is activated, the guide pins 40 are pushed through the apertures 22 in the housing 20 and associate with the apertures 27 formed within the cogwheel 25 to provide an electric park brake feature.

In operation the solenoid mechanism 30 is not powered in its inactive state and the guide pins 40 are in a retracted position. When a park load is applied to the electric caliper motor 10, the solenoid mechanism is powered and fired to push the guide pins 40 through the apertures 22 in the housing 20 and into the apertures 27 formed within the cog wheel 25. The power is then cut to the electric caliper motor 10 and the stored potential energy maintains the cogwheel's 25 interaction with the guide pins 40. The power to the solenoid mechanism 30 is also cut when the power to the electric caliper motor 10 is cut. When the park brake feature is to be released, the solenoid mechanism 30 is again powered and fired to remove the guide pins 40 from the cog wheel 25, and return the guide pins to their rest position. The electric caliper motor 10 may need to be over applied to remove the lateral force for the guide pins 40 to release. A manual release 50 may also be utilized as described below.

Figure 2:
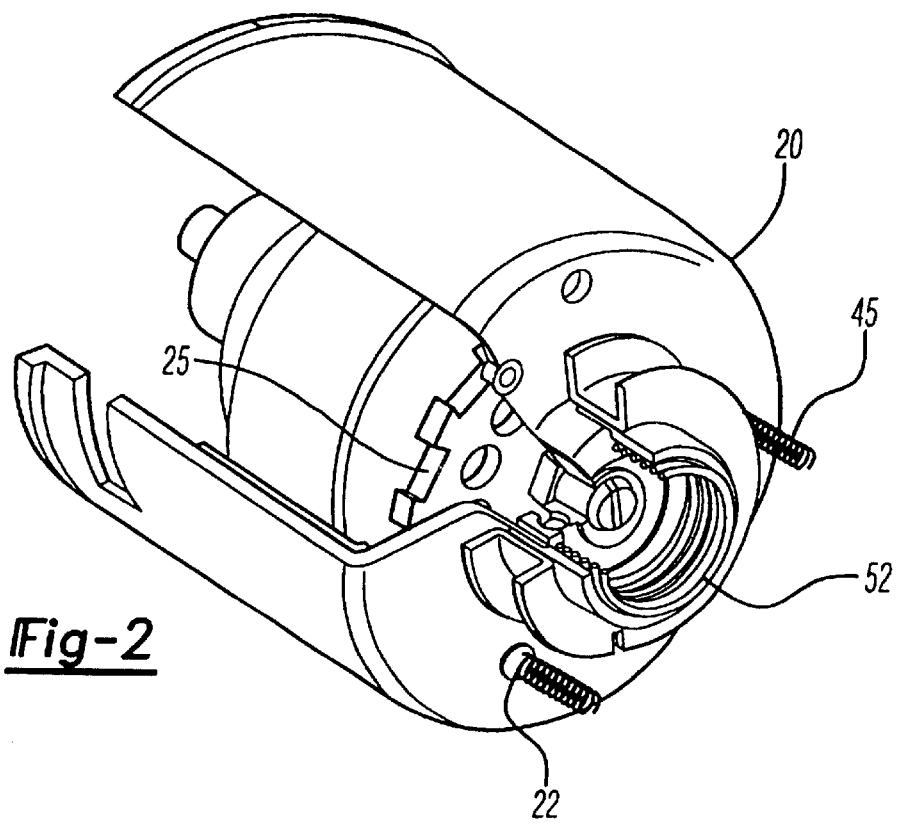
FIG. 2 is a perspective partially cut away view of the electric park brake assembled on the exterior of the electric caliper housing.
Figure 3:
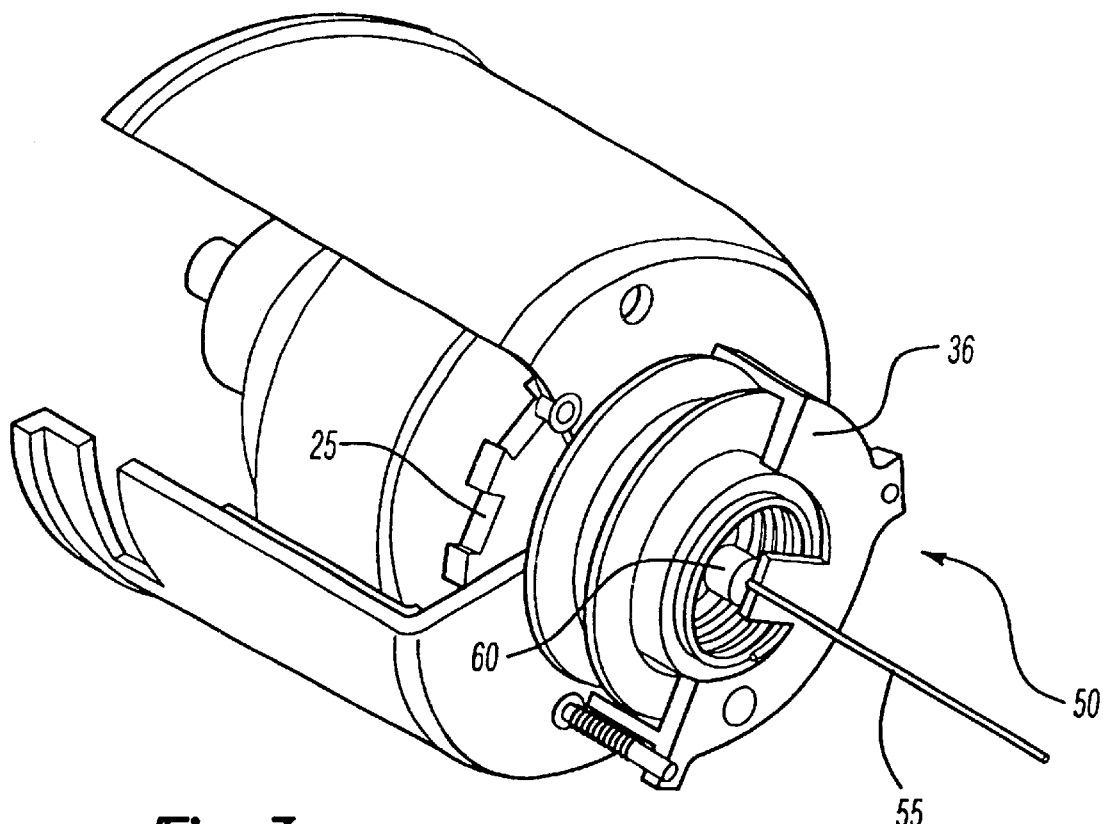
FIG. 3 is a perspective partially cut away view showing the electric park brake assembled on the exterior of the electric caliper housing and further detailing a manual release feature.

The electric park brake 5 of the present invention also includes a manual release mechanism 50. The manual release mechanism 50 is used to release the park brake should an electrical problem occur that would not allow the solenoid and guide pins 40 to be retracted electrically. With reference to FIGS. 2 and 3, the manual release mechanism 50 includes a spring 52 that is disposed against the housing 20 and the translation piece 36. The spring maintains the orientation of the solenoid mechanism 30 against the housing 20. The manual release mechanism 50 also includes a cable 55 that is coupled to the translation piece 36 via a terminal piece 60. When a sufficient force is applied to the cable 55, the spring 52 is extended, and the guide pins 40 that are coupled to the translation piece 36 are pulled out of the apertures 27 formed in the cogwheel 25. This allows the shaft 15 to again freely rotate.

While preferred embodiments are disclosed, a worker in this art would understand that various modifications would come within the scope of the invention. Thus, the following claims should be studied to determine the true scope and content of this invention.

What is claimed is:

1. An electric park brake for use in an electric caliper brake system comprising:
    a. an electric caliper motor assembly, said electric caliper motor assembly including a motor operably coupled to a shaft, said motor and shaft surrounded by a housing;
    b. a cogwheel disposed on and operably connected to said shaft within said housing;
    c. a solenoid mechanism disposed on said housing and positioned axially in relation to said shaft;
    d. at least one guide pin associated with said solenoid mechanism, said guide pin interacting with said cogwheel when said solenoid is activated for providing a park brake feature and preventing movement of said shaft.

2. The electric park brake of claim 1, wherein said housing has at least one aperture formed therein corresponding to a location of said at least one guide pin for allowing entry of said at least one guide pin into said housing to interact with said cogwheel.

3. The electric park brake of claim 1, wherein said cogwheel has apertures formed therein for receiving said at least one guide pin when said solenoid mechanism is activated.

4. The electric park brake of claim 3, further including a manual release mechanism for retracting said at least one guide pin from said aperture without the use of power.

5. The electric park brake of claim 4, wherein said manual release mechanism comprises a cable attached to said solenoid mechanism whereby said at least one guide pin is retracted from said aperture when a sufficient force is applied to said cable.

6. The electric park brake of claim 1, wherein said at least one guide pin further includes a spring disposed axially about said guide pin.

7. The electric park brake of claim 1, wherein said at least one guide pin comprises three guide pins.

8. The electric park brake of claim 2, wherein said at least one aperture formed in said housing comprises three apertures.

* * * * *